(12) United States Patent
Fujiwara et al.

(10) Patent No.: US 8,185,299 B2
(45) Date of Patent: May 22, 2012

(54) ROUTE SEARCH DEVICE AND ROUTE SEARCH METHOD

(75) Inventors: Junsuke Fujiwara, Hitachinaka (JP);
Takumi Fushiki, Hitachi (JP);
Yoshinori Endo, Mito (JP)

(73) Assignee: Xanavi Informatics Corporation, Zama-shi (JP)

( * ) Notice: Subject to any disclaimer, the term of this patent is extended or adjusted under 35 U.S.C. 154(b) by 847 days.

(21) Appl. No.: 12/179,389

(22) Filed: Jul. 24, 2008

(65) Prior Publication Data

US 2009/0037100 A1 Feb. 5, 2009

(30) Foreign Application Priority Data

Jul. 25, 2007 (JP) ................................ 2007-193292

(51) Int. Cl.
*G01C 21/32* (2006.01)
(52) U.S. Cl. .................... 701/202; 701/209; 340/905
(58) Field of Classification Search .......... 701/200–202, 701/204, 209–211, 301; 340/995.13, 905
See application file for complete search history.

(56) References Cited

U.S. PATENT DOCUMENTS

| | | | | |
|---|---|---|---|---|
| 6,134,500 | A * | 10/2000 | Tang et al. ..................... | 701/202 |
| 6,370,475 | B1 * | 4/2002 | Breed et al. .................... | 701/301 |
| 6,381,538 | B1 * | 4/2002 | Robinson et al. .............. | 701/211 |
| 7,174,248 | B2 * | 2/2007 | Suzuki ............................ | 701/96 |
| 7,463,973 | B2 * | 12/2008 | Okude et al. ................... | 701/202 |
| 7,546,206 | B1 * | 6/2009 | Miller et al. ................... | 701/210 |
| 2004/0225437 | A1 * | 11/2004 | Endo et al. ..................... | 701/209 |
| 2005/0021225 | A1 * | 1/2005 | Kantarjiev et al. ........... | 701/204 |
| 2005/0234637 | A1 * | 10/2005 | Obradovich et al. ......... | 701/200 |
| 2006/0082472 | A1 * | 4/2006 | Adachi et al. ............. | 340/995.13 |
| 2006/0241862 | A1 * | 10/2006 | Ichihara et al. ............... | 701/209 |
| 2008/0234927 | A1 * | 9/2008 | O'Neill ......................... | 701/204 |
| 2009/0088965 | A1 * | 4/2009 | Burckart et al. .............. | 701/201 |

FOREIGN PATENT DOCUMENTS

JP 2002-206936 A 7/2002

* cited by examiner

*Primary Examiner* — Gerald J. O'Connor
*Assistant Examiner* — Natalie A Pass
(74) *Attorney, Agent, or Firm* — Crowell & Moring LLP

(57) ABSTRACT

A route to a destination in which required travel time barely varies depending on weather is searched for without referring to weather forecast or weather information. A route search device comprises following means: a storage medium for storing traffic information including travel times by weather conditions for each link comprising a road on a map; a pointing device which sets a starting point and a destination; a weather condition-based route search module that determines the shortest travel time route from the starting point to the destination by weather conditions using the traffic information stored in the storage medium; a link series-identifying module that extracts link series which vary with weather conditions from link series comprising the shortest travel time route determined by the weather condition-based route search module, determines the required travel time by weather conditions for the each link series that vary with weather conditions by using the traffic information stored in the storage medium, and identifies a link series whose required travel time barely varies depending on weather conditions; and a link series-registering medium that registers the link series identified by the link series-identifying module as a link series comprising a guide route from the starting point to the destination.

10 Claims, 11 Drawing Sheets

STATISTICAL TRAFFIC INFORMATION

FIG. 4

TYPE-OF-DAY CALENDAR

124

| DATE | DAY OF THE WEEK | CORRESPONDING TYPE OF DAY |
|---|---|---|
| ⋮ | ⋮ | ⋮ |
| Jul. 8, 2006 | SATURDAY | TYPE OF DAY 4 (HOLIDAY 1) |
| Jul. 9, 2006 | SUNDAY | TYPE OF DAY 5 (HOLIDAY 2) |
| Jul. 10, 2006 | MONDAY | TYPE OF DAY 1 (WEEKDAY 1) |
| Jul. 11, 2006 | TUESDAY | TYPE OF DAY 2 (WEEKDAY 2) |
| Jul. 12, 2006 | WEDNESDAY | TYPE OF DAY 2 (WEEKDAY 2) |
| Jul. 13, 2006 | THURSDAY | TYPE OF DAY 2 (WEEKDAY 2) |
| Jul. 14, 2006 | FRIDAY | TYPE OF DAY 3 (WEEKDAY 3) |
| Jul. 15, 2006 | SATURDAY | TYPE OF DAY 4 (HOLIDAY 1) |
| Jul. 16, 2006 | SUNDAY | TYPE OF DAY 5 (HOLIDAY 2) |
| Jul. 17, 2006 | MONDAY | TYPE OF DAY 1 (WEEKDAY 1) |
| ⋮ | ⋮ | ⋮ |

1241 — DATE
1242 — DAY OF THE WEEK
1243 — CORRESPONDING TYPE OF DAY

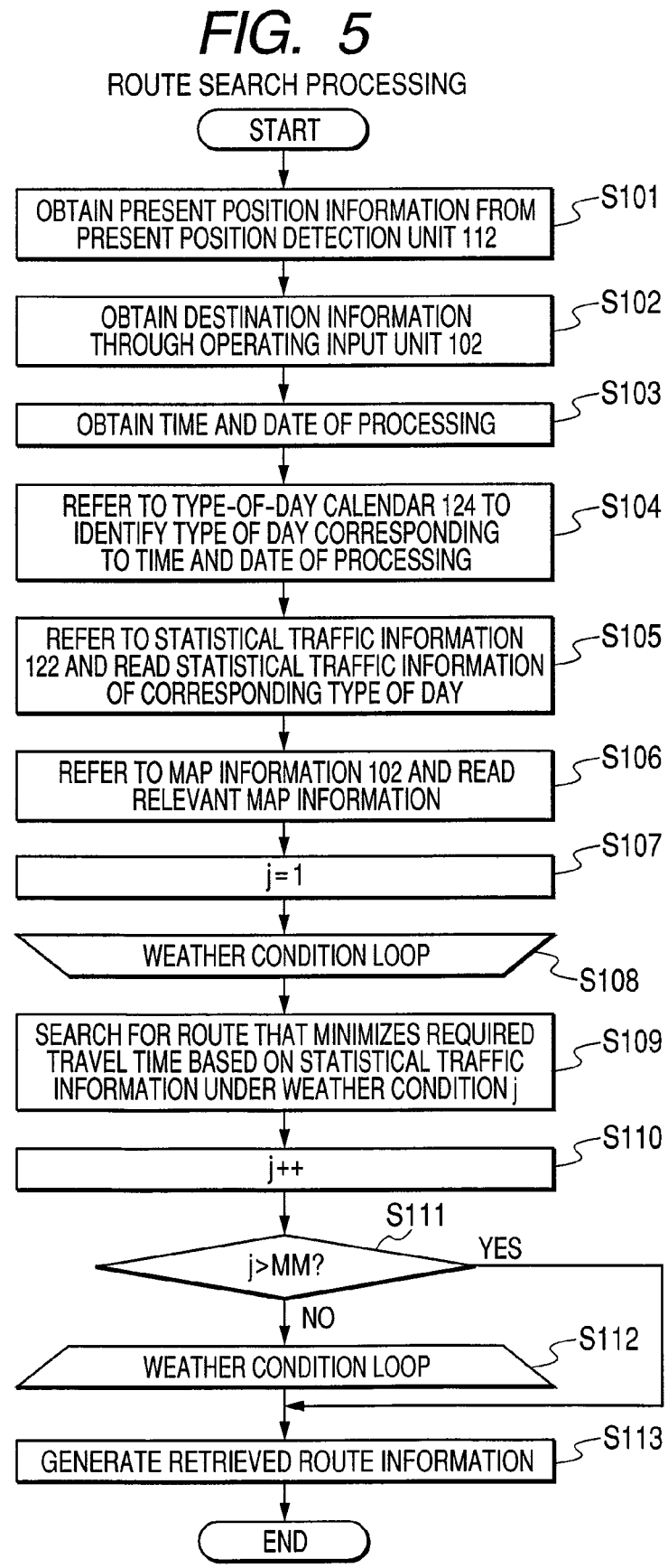

FIG. 6

WEATHER CONDITION-BASED SEARCHED
ROUTE INFORMATION

126

| WEATHER CONDITION j | ROUTE-COMPRISING LINK SERIES |
|---|---|
| 1: FINE | * * *, * * *, * * *, · · · |
| 2: CLOUDY | * * *, * * *, * * *, · · · |
| 3: RAINY | * * *, * * *, * * *, · · · |
| ⋮ | ⋮ |

1262 — WEATHER CONDITION j
1261 — ROUTE-COMPRISING LINK SERIES

REQUIRED TRAVEL TIME DIFFERENCE COMPARISON PROCESSING

ROUTE SEARCH DEVICE AND ROUTE SEARCH METHOD

CLAIM OF PRIORITY

The present application claims priority from Japanese Patent Application JP 2007-193292 filed on Jul. 25, 2007, the content of which is hereby incorporated by reference into this application.

FIELD OF THE INVENTION

The present invention relates to a method for searching for a guide route to a destination based on traffic information on road traffic situations, and a route search device using the method.

BACKGROUND OF THE INVENTION

In recent years, the following automobile navigation systems (hereafter, referred to as in-vehicle terminals) have been mounted in vehicles: automobile navigation systems provided with statistical traffic information generated based on traffic information including situations of the past traffic jams and link travel time on each road together with map information related to the roads. The statistical traffic information is information generated by classifying past traffic information by types of day, such as weekday, holiday, long consecutive holidays, and averaging it by period of time. Referring to this information, an in-vehicle terminal can search for a route excluding ordinarily congested areas and further enhance the accuracy of estimation of required travel time for going to a destination.

However, situations of a traffic jam and link travel time largely vary with weather factors as well as types of day. Even when types of day are identical, therefore, patterns of a traffic jam can be expected to differ from each other. An example will be given. An area around a railroad station in the morning and evening on a weekday tends to be more congested when it is rainy than when it is fine. Conversely, an area around an outdoor facility on a holiday tends to be more congested when it is fine. Just a type-of-day factor cannot account for these tendencies, which a weather factor largely influences. To eliminate this instability of route search due to a weather factor, Japanese Patent Application Laid-Open Publication No. 2002-206936 discloses a method for search for a route with a weather factor taken into account. In this method, an in-vehicle terminal stores statistical traffic information by weather conditions, which is obtained by classifying past traffic information by type-of-day and weather factors (for example, fine weather or rainy weather) and taking statistics on the classified information. Further, the route search executed in the method refers to weather forecast information related to each area and acquired externally or weather information detected by a wiper on the vehicle and so on.

Unfortunately, the above technique, requiring a communication device and a sensor device to externally obtain the weather forecast information and the weather information, makes the configuration of an in-vehicle terminal complex. Moreover, since weather forecast information is referred to during the route search, if the weather forecast is not right and the weather is different from the expected one, the estimation of required travel time gets less accurate, reducing the accuracy of the route search.

An object of the invention is to provide a device and method for searching a route to a destination in which, without referring to weather forecast information or weather information, required travel time barely varies by the weather.

SUMMARY OF THE INVENTION

To achieve the above object, in a route search device and method of the invention, the route to a destination is searched by using only statistical traffic information based on weather conditions, not using the weather forecast information or the weather information.

As an example of the invention, a route search device comprises a storage medium for storing traffic information classified by weather conditions; a pointing device which sets a starting point (present position) and a destination; and a guide route search module that searches for a route smallest in the amount of variation in required travel time depending on weather conditions from the starting point to the destination as a guide route by using the traffic information stored in the storage medium.

As another example of the invention, in the above route search device, the traffic information stored in the storage medium includes travel time for each link comprising a road on a map under each weather condition. Moreover, the guide route search medium in the above route search device includes a weather condition-based route search module that determines a shortest travel time route from the starting point to the destination under each weather condition by using the traffic information stored in the storage medium; a link series-identifying module that extracts link series which vary with weather conditions from link series comprising the shortest travel time route determined by the weather condition-based route search module, determines required travel time for each of the link series that vary with weather conditions by using the traffic information stored in the storage medium, and identifies a link series smallest in the amount of variation in required travel time depending on weather conditions; and a link series-registering medium for registering a link series identified by the link series-identifying module as a link series comprising the guide route from the starting point to the destination.

BRIEF DESCRIPTION OF THE DRAWINGS

FIG. 4 illustrates a configuration of a type-of-day calendar;

FIG. 5 is a flowchart illustrating route search processing;

FIG. 6 illustrates a configuration of weather condition-based searched route information;

DETAILED DESCRIPTION OF THE PREFERRED EMBODIMENTS

Hereafter, detailed description will be given to an embodiment of the present invention with reference to drawings.

Figure 1:
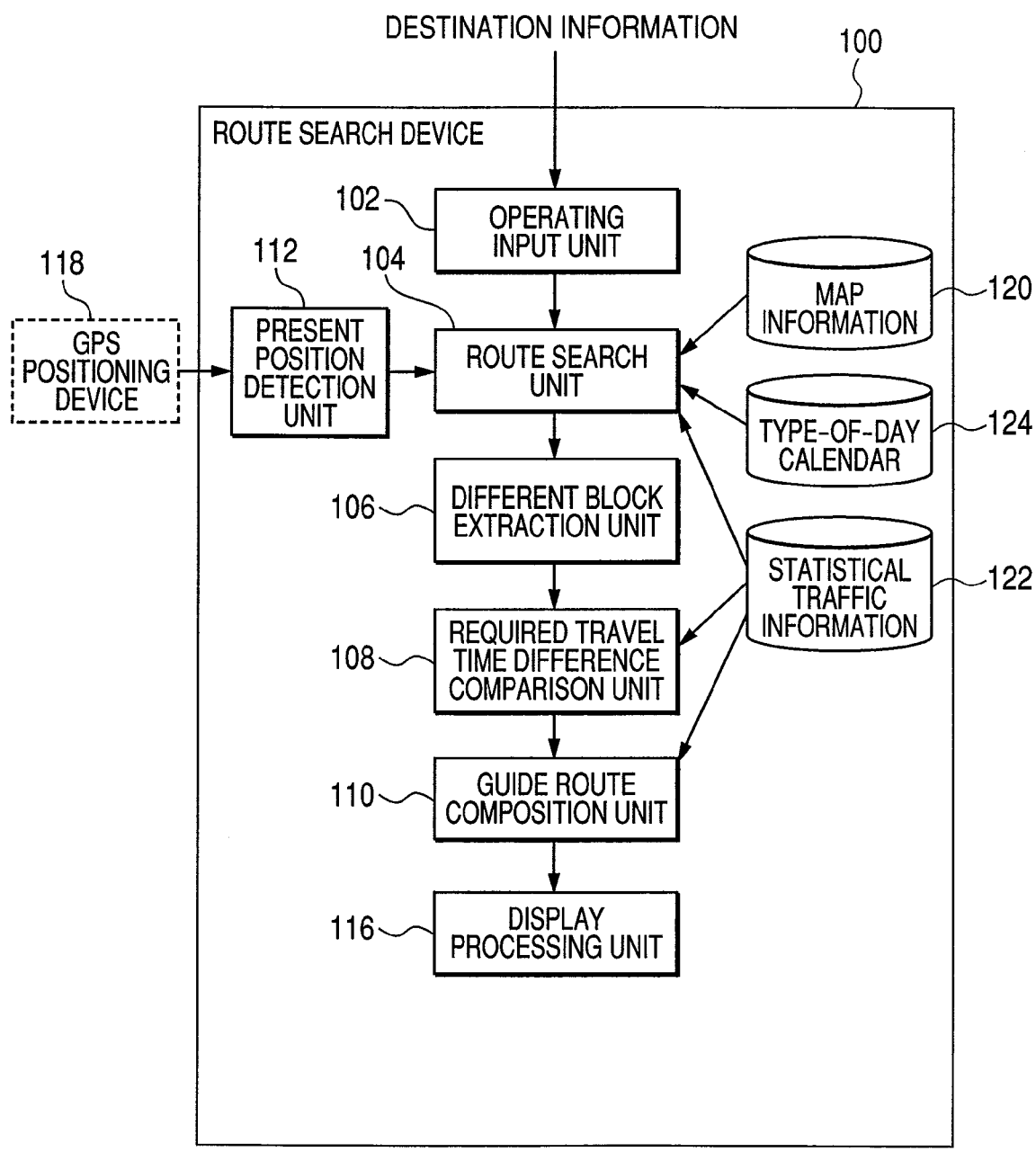
FIG. 1 is a block diagram of a route search device in accordance with an embodiment of the invention.

FIG. 1 is an example of a functional block diagram of a route search device 100 in accordance with an embodiment of the present invention.

The route search device 100 includes an operating input unit 102, a route search unit 104, a different block extraction unit 106, a required travel time difference comparison unit 108, a guide route composition unit 110, a display processing unit 116, and a present position detection unit 112. The route search device 100 also includes a storage device which stores map information 120, statistical traffic information 122 by weather conditions, and type-of-day calendar 124.

The route search device 100 is structured by a computer having a central processing unit (CPU), not shown, and the storage device, now shown, such as a semiconductor memory and a hard disk drive. Further, the route search device 100 includes an input device such as a touch panel and a hard switch and a display device such as a liquid crystal display. The central processing unit executes a predetermined program stored in the storage device, operating the above-mentioned units 102 to 116. For this reason, programs for above each unit to process are also stored in the storage device.

The operating input unit 102 receives information related to a destination inputted from a switch button or a remote controller, not shown, and information instructing the execution of route search processing. It controls the functions of the route search unit 104 by these pieces of information.

The present position detection unit 112 detects a position of a relevant vehicle (a position of a vehicle equipped with the route search device 100) based on a signal inputted from a GPS (Global Positioning System) positioning device 118.

The route search unit 104 carries out a processing of searching for a route from a starting point to a destination. Specifically, it searches for a route from a position of the relevant vehicle detected by the present position detection unit 112 to a destination set by the operating input unit 102 by using the map information 120, statistical traffic information 122, and the type-of-day calendar 124. At this time, the route search unit 104 identifies time and date as to when the route search processing is carried out based on such information as related to time and data added to a signal received by the GPS positioning device 118 or as obtained from a clock, not shown, built in the route search device 100. The route search unit 104 refers to the type-of-day calendar 124 based on the date and identifies a type of day corresponding to the date. Then, it reads statistical traffic information corresponding to the type of day from the statistical traffic information 122. It searches for a route by which the vehicle can arrive at the destination in the shortest time with respect to each weather condition and outputs the search result to the different block extraction unit 106 as retrieved route information.

The different block extraction unit 106 carries out the following processing with respect to each route which has been retrieved by the weather conditions and outputted from the route search unit 104: a processing of extracting common blocks irrelevant to weather conditions and different blocks that vary with weather conditions. The common block refers to a block where a series of link IDs (codes for identifying links) in a weather condition is identical to ones in other weather conditions when the link series comprising each route searched for by weather conditions are compared from a start point to an end point. The different block refers to a block where a series of link IDs in a weather condition differs from ones in other weather conditions. (That is, the different block refers to a block from a node where a road bisects to a node where bisected roads meet each other again.)

The required travel time difference comparison unit 108 selects a block where a difference in required travel time by each weather condition in the block is smallest of the different blocks. (That is, it selects a block where a difference in required travel time due to weather conditions is barely produced.) Then, it carries out a processing of registering the block as a block comprising the guide route.

The guide route composition unit 110 carries out a processing of comprising a route to the destination including the block, based on information related to blocks comprising the guide route outputted from the required travel time difference comparison unit 108; and outputting this route to the display processing unit 116 as the guide route.

The display processing unit 116 carries out a processing of displaying a menu screen and information related to a guide route on the display device.

Description will be given to the map information 120, the statistical traffic information 122, and the type-of-day calendar 124 stored in the storage device of the route search device 100.

Figure 2:
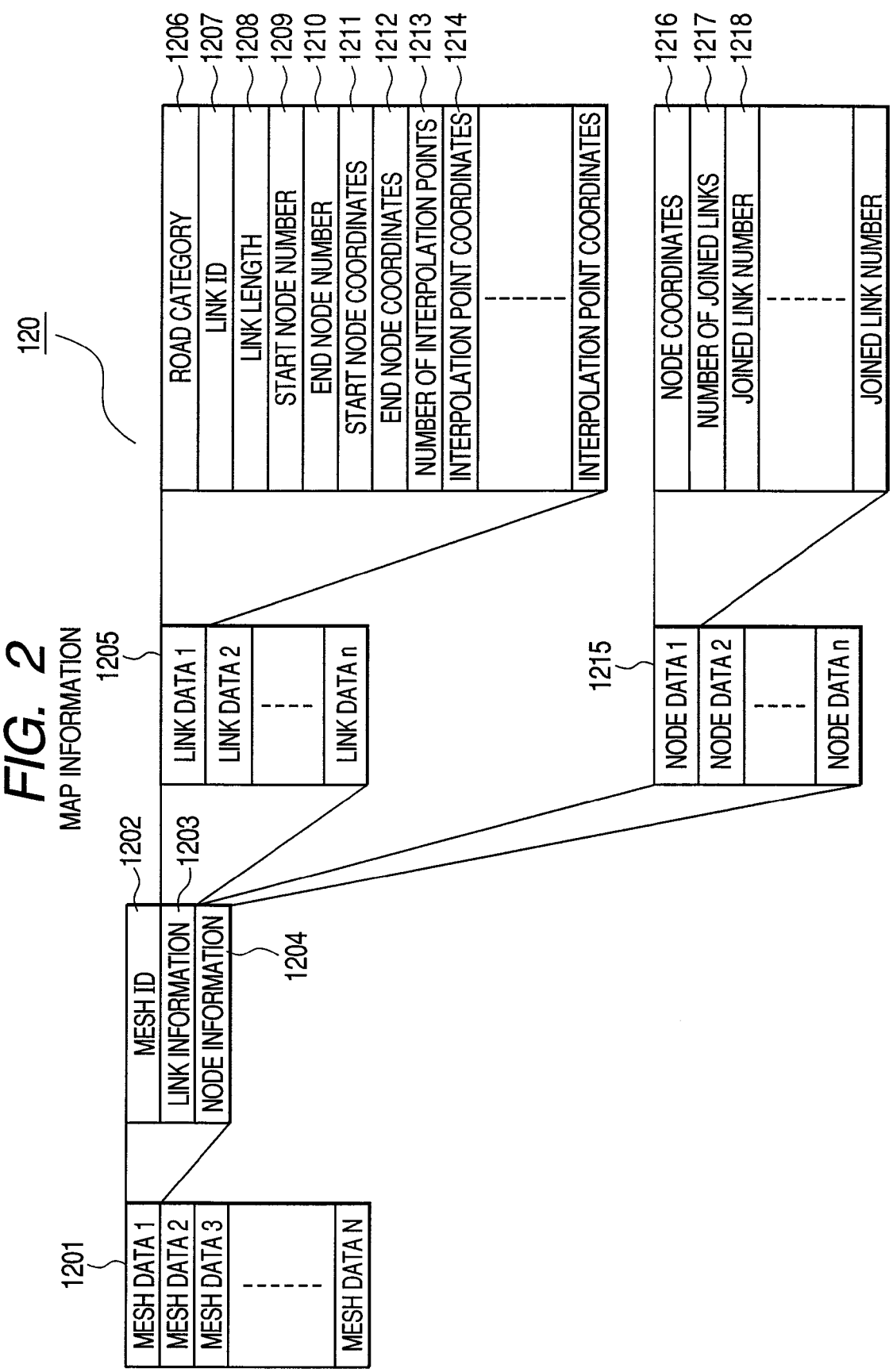
FIG. 2 illustrates a configuration of map information.

FIG. 2 illustrates a configuration of the map information 120. The map information 120 includes mesh data 1201 related to each mesh that represents a zoned area on a map. The mesh data 1201 includes information representing the map in the relevant mesh, which are a mesh ID 1202 that is a code for identifying the mesh, link information 1203, and node information 1204. The link information 1203 includes link data 1205 related to each link comprising roads on a map. The link data 1205 includes the following data: road category (classification of a national road or a prefectural road, for example) 1206; link ID 1207 that is a code for identifying the link; link length 1208; start node number 1209 of the link; end node number 1210 of the link; start node coordinates 1211; end node coordinates 1212; the number of interpolation points 1213; and interpolation point coordinates 1214 corresponding to the number of the interpolation points 1213. The node refers to a point, such as an intersection, at which a road is segmented into links. The interpolation point coordinates are information indicating an absolute position on the map represented by latitude and longitude or the like. A curbed or crooked link is represented by series of the interpolation point coordinates 1214.

The mesh data may include topographic information such as a coast, a mountain or a river, or location information such as a building or a facility in addition to link information and node information since it is information representing the map.

The node information 1204 includes node data 1215 related to each node. The node data 1215 is detailed data related to all the nodes in the relevant mesh, and it includes node coordinates 1216, the number of joined links 1217, and joined link numbers 1218.

Figure 3:
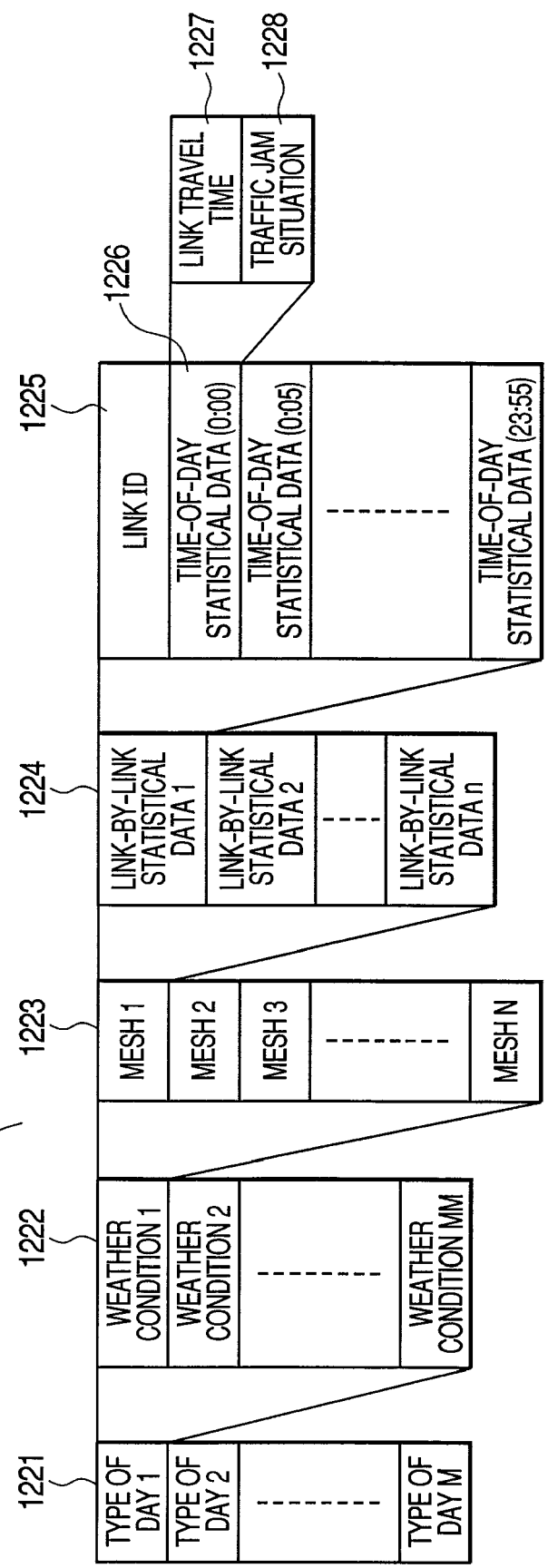
FIG. 3 illustrates a configuration of statistical traffic information.

FIG. 3 illustrates the configuration of the statistical traffic information 122. As illustrated in FIG. 3, the statistical traffic information 122 includes link-by-link statistical data 1224, which is corresponding to a type of day (type of day 1 . . . type of day M) 1221 such as weekday, holiday, or long consecutive holidays; weather conditions (weather condition 1 . . . weather condition MM) 1222 such as fine, cloudy, rainy, or snowy; and meshes (mesh 1 . . . mesh N) 1223.

The link-by-link statistical data 1224 includes time-of-day statistical data 1226 (for example, every five minutes from 0:00 to 23:55) with respect to each of link IDs 1225 (link number 1 . . . link number n). The time-of-day statistical data 1226 includes a link travel time 1227 and a traffic jam situation 1228 for the relevant period of time.

The statistical traffic information 122 is generated based on a past actual traffic situation and is stored beforehand in the storage device of the route search device 100. It may also be downloaded from a server that distributes traffic information or generated by the route search device 100 itself based on the past actual traffic situation.

FIG. 4 illustrates a configuration of a type-of-day calendar 124, which stores dates 1241, their days of the week 1242, and their types of day (type of day 1 to type of day M) related to each other. Therefore, a corresponding type of day 1243 to an arbitrary date can be identified by referring to the type-of-day calendar 124.

<Description of Operation>

Description will be given to operations of the route search device 100 configured as mentioned above.

FIG. 5 is a flowchart illustrating a route search processing flow carried out by the route search unit 104.

The route search unit 104 starts the flow, for example, when it receives a route search request from a user through an input device and the operating input unit 102. Instead of this, it may start the processing when it receives a request from a user to search for a route with less influence of a weather condition as will hereinafter be described.

First, the route search unit 104 refers to the information on the position of the relevant vehicle detected by the present position detection unit 112 and specifies the latitude and longitude indicating the absolute position of the relevant vehicle (S101).

Then, the route search unit 104 specifies the latitude and longitude indicating the absolute position of a destination based on the destination information received from the user through the operating input unit 102 (S102).

Then, the route search unit 104 specifies a time and date (S103) when the route search processing is carried out (that is, a time and date when the vehicle departs from the present position), utilizing a GPS signal received by the GPS positioning device 118 or a clock built in the route search device 100. When a route search is carried out at an arbitrary time or an arbitrary date (that is, when a time and date of departure is arbitrarily set), the route search unit 104 may refer to a time and date received from the user through the operating input unit 102 to specify them.

The route search unit 104 refers to the type-of-day calendar 124 to identify a type of day I corresponding to the date specified at Step S103 (S104).

The route search unit 104 reads from the statistical traffic information 122 the statistical traffic information whose type of day 1221 is equal to the type of day I identified at Step S104 (S105).

The route search unit 104 reads the map information 120 (S106). At this time, it may carry out, for example, the following processing: a circle is imagined whose center is the present position and whose radius is the direct distance between the present position and the destination; another circle is imagined whose center is the destination and whose radius is same as the above one; an overlapping area of the two circles is identified; this area is taken as an area in which route search is to be carried out; and the map information of meshes in the area is read.

The route search unit 104 initializes a variable j, which is used to identify the weather conditions, to 1 (S107). Then, it carries out weather condition loop processing (S108 to S112).

In the weather condition loop processing, first, the route search unit 104 searches for a route from the present position to the destination that minimizes the sum of link cost, which is the link travel time of each link at a target time, using the statistical traffic information under weather condition j in the statistical traffic information 122 read at Step S105 (S109). As a method for the route search, the Dijkstra method is used, for example.

Thereafter, the route search unit 104 increments the variable j (S110). Further, it compares the variable j with the maximum value MM of the number of the weather conditions. If the variable j is not greater than MM, the processing returns to the first one (S109) of the weather condition loop (S108 to S112) and is continued. If the variable j is greater than MM, the processing exits the loop and proceeds to the one at Step S113.

Then, the route search unit 104 generates information related to the route searched for by each weather condition as weather condition-based searched route information 126 (S113), and terminates the route search processing.

FIG. 6 illustrates a configuration of the weather condition-based searched route information 126 generated by the route search unit 104. The weather condition-based searched route information 126 includes link series (route-comprising link series) 1261 with respect to each weather condition (j) 1262. In the each link series 1261, links comprising the searched route are sequentially arranged from the starting point.

<Different Block Extraction Processing>

Detailed description will be given to different block extraction processing carried out at the different block extraction unit 106.

Figure 7:
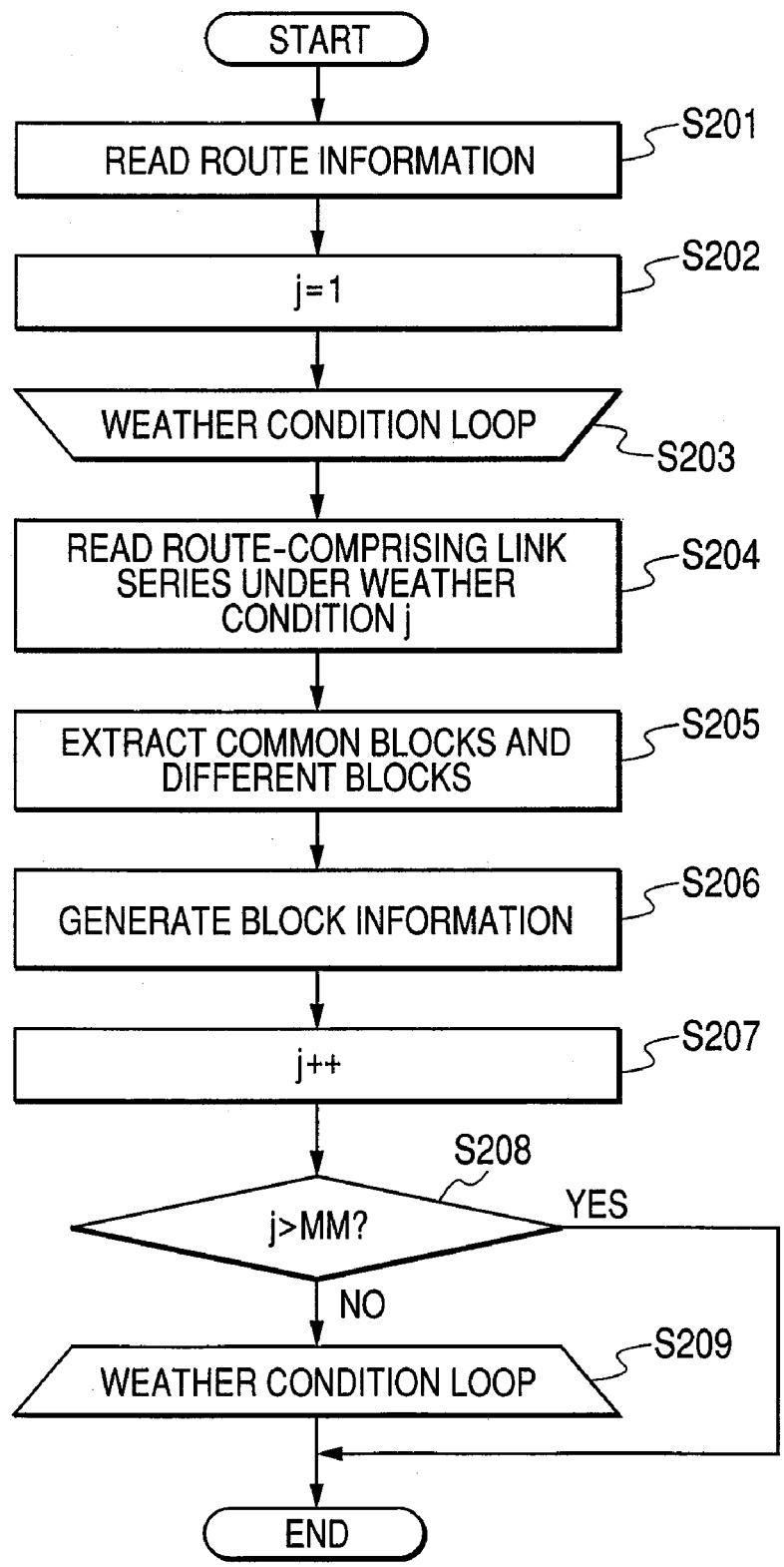
FIG. 7 is a flowchart illustrating different block extraction processing.

FIG. 7 is a flowchart of the different block extraction processing. The different block extraction unit 106 starts this flow when the route search processing in the route search unit 104 is terminated.

First, the different block extraction unit 106 reads the weather condition-based searched route information 126 generated in the route search unit 104 (S201).

The different block extraction unit 106 initializes the variable j, which is used to identify the weather conditions, to 1 (S202).

The different block extraction unit 106 carries out weather condition loop processing (S203 to S209).

In the weather condition loop processing, first, the different block extraction unit 106 reads the route-comprising link series 1261 under the weather condition 1262 equivalent to weather condition j from the weather condition-based searched route information 126 (S204).

The different block extraction unit 106 extracts the following two kinds of blocks from the route-comprising link series 1261 under the weather condition j: blocks where a part of the link series under the weather condition j is common to ones under all the other weather conditions (i≠j, i=1 to MM) (referred to as "common blocks"); and blocks where a part of the link series under the weather condition j is different from any other weather conditions (referred to as "different blocks") (S205). As a result, the route to the destination is segmented into the common blocks and the different blocks (S206). Hereafter, the segmented block will be referred to as route block.

Figure 8:
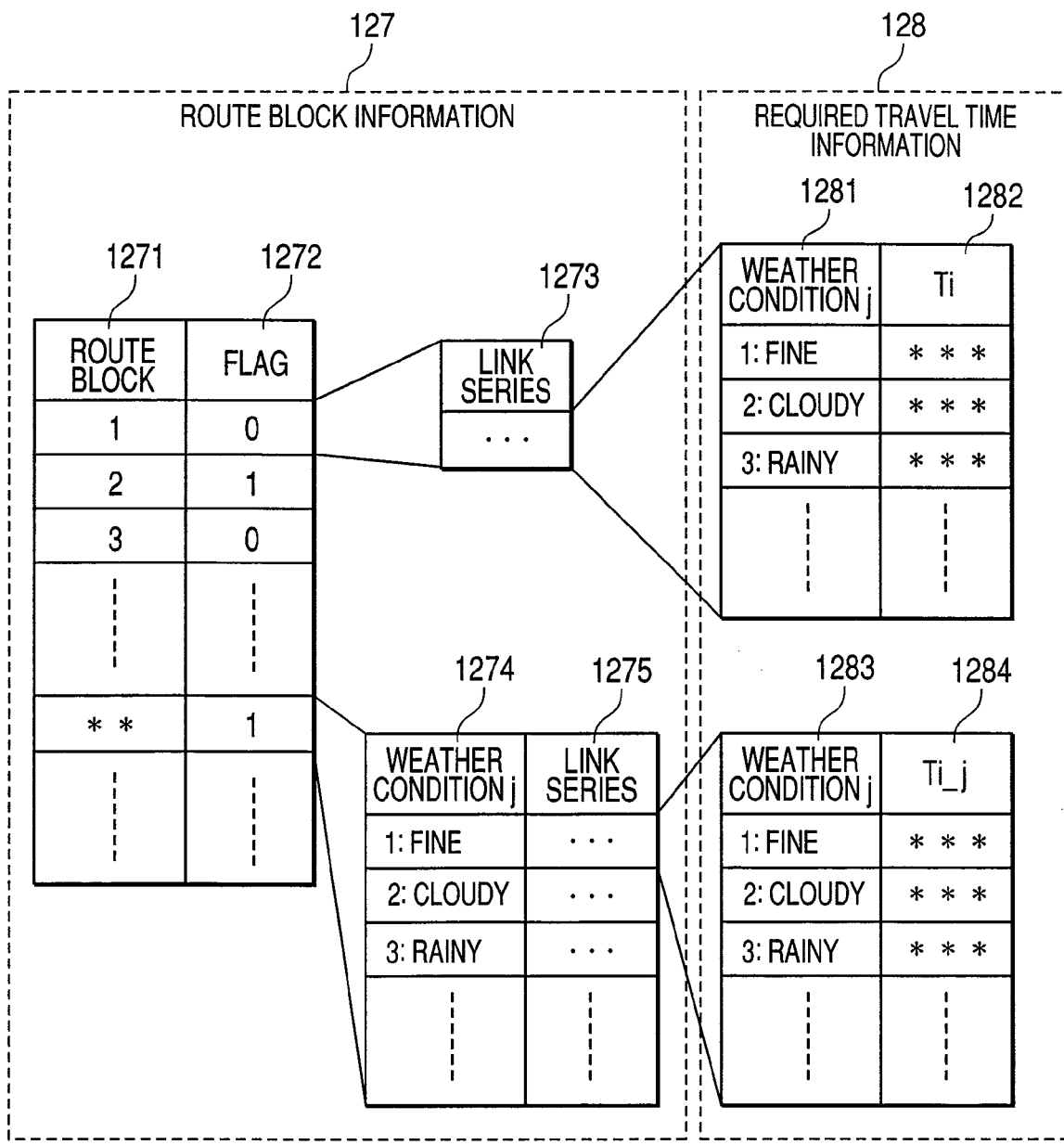
FIG. 8 illustrates configurations of route block information and required travel time information.

The different block extraction unit 106 generates route block information 127, as illustrated in FIG. 8, in which information related to each route block is stored. Specifically, the different block extraction unit 106 sets a flag on the each route block 1271 and stores the block information sequentially from the starting point in the route block information 127. The flag is for identifying whether a route block is a common block (the flag is set to "0") or a different block (the flag is set to "1"). If a route block 1271 is a common block, link series 1273 is stored which is corresponding to the route block of the route-comprising link series 1261 under the weather condition j. When the link series has already been stored, it does not need to be overwritten. Meanwhile, if a route block 1271 is a different block, the following processing is carried out: of the route-comprising link series 1261 under the weather condition j, link series 1275 which is corresponding to the route block is stored with the weather condition j 1274.

Then, the different block extraction unit 106 increments the variable j (S207), and compares the variable j with the maximum value MM of the number of weather conditions (S208). If the variable j is not greater than the maximum value MM (NO at S208), the different block extraction unit 106 returns to the first processing (S204) of the weather condition loop (S203 to S209), and continues the processing. If the variable j is greater than the maximum value MM (YES at S208), the processing exits the weather condition loop (S203 to S209) and terminates.

As a result, the different block extraction unit 106 completes the route block information 127 illustrated in FIG. 8 to completion.

<Required Travel Time Difference Comparison Processing>

Description will be given to required travel time difference comparison processing which is carried out following the above-mentioned route block extraction processing.

Figure 9:
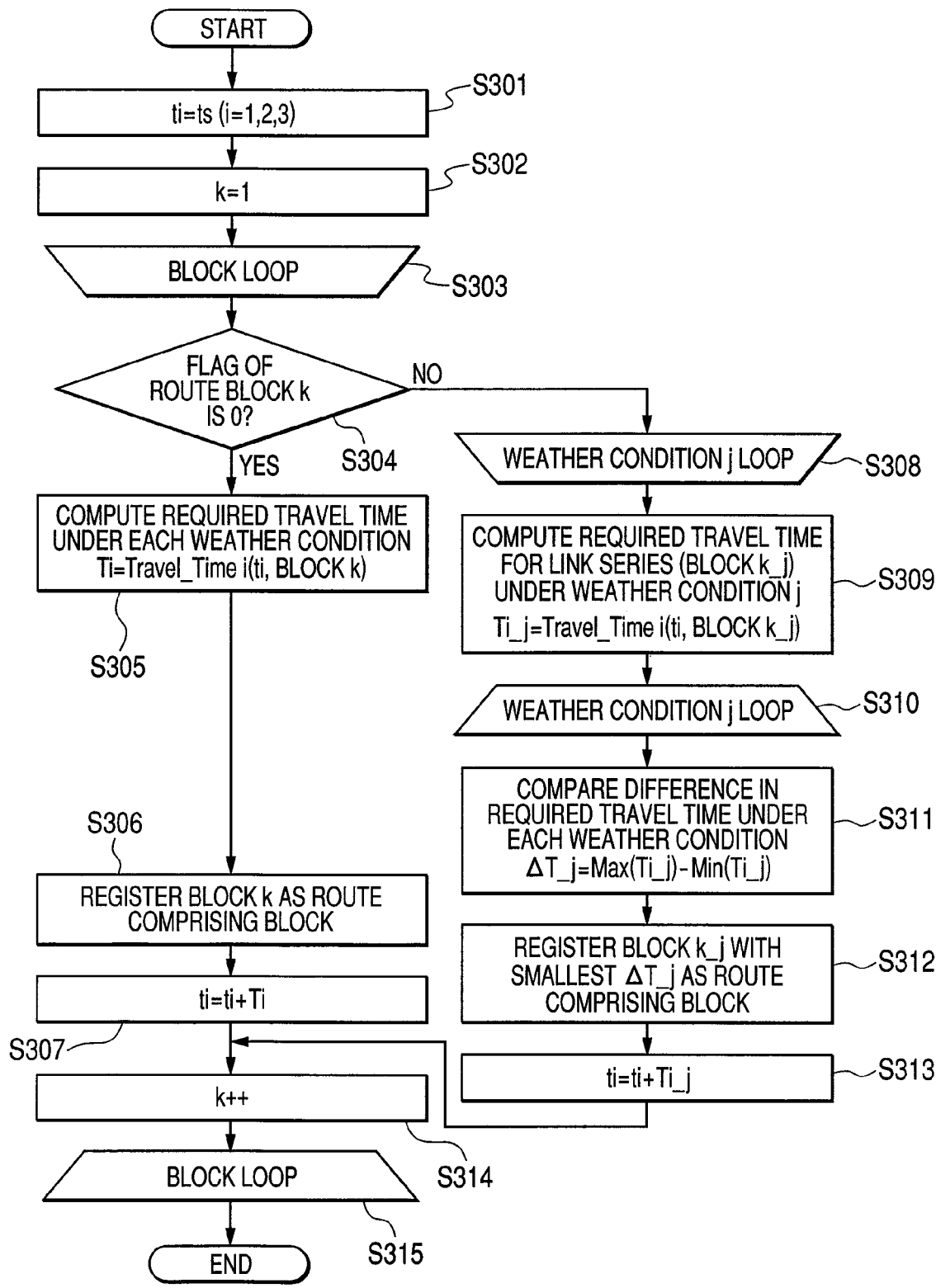
FIG. 9 is a flowchart illustrating required travel time difference comparison processing.

FIG. 9 is a flowchart illustrating the processing.

First, description will be given to each variable and function used in this processing. Variable ts denotes a time when the vehicle departs from the present position. Variable ti denotes a passage time through a start point of the route block under the weather condition i (i=1, 2, 3 . . . ). Variable k is an ID for identifying the route block. Variable k_j is an ID indicating that a route block k is a different block and is used when the link series varies with weather condition j (that is, when the flag 1272 in the route block information 127 is set to "1"). Variable Ti indicates a required travel time for going through a route block under the weather condition i.

Travel_Time i (ti, route block k) is a function for computing a required travel time for going through a route block k at time ti, using the statistical traffic information for the weather condition i. For example, the link travel time 1227, which is in the statistical traffic information 122 in FIG. 5, for the first link comprising a route block k under the weather condition i is specified as follows: the type of day 1221 is a type of day identified at Step S104; the weather condition 1222 is a weather condition i; the link ID 1225 is a link ID of this link; and the link travel time 1227 is a link travel time in the time-of-day statistical data 1226 which the time ti belongs to. The link travel time for the second link is a link travel time 1227 in the time-of-day statistical data 1226 to which "a time obtained by adding the link travel time for the first link to the time ti" belongs. That is, the link travel time for the nth link is a link travel time 1227 in the time-of-day statistical data 1226 to which a time obtained by adding the link travel time for the (n−1)th link to a passage time through a start point of the (n−1)th link belongs. After the link travel time is determined for each link comprising the route block k, all the link travel times are added, obtaining the required travel time Ti (Ti_j) for going through the route block k.

Hereafter, description will be given to the flow of the required travel time difference comparison processing. First, the required travel time difference comparison unit 108 initializes ti under each weather condition i (i=1, 2, 3 . . . ) to ts (S301). That is, the passage time ti through the start point of the route block under the weather condition i is set as the departure time ts from the present position. Further, the required travel time difference comparison unit 108 initializes k to 1 (S302).

Then, the required travel time difference comparison unit 108 carries out block loop processing (S303 to S315).

In the block loop processing, first, the required travel time difference comparison unit 108 refers to the route block information 127 illustrated in FIG. 8 and determines whether or not the flag 1272 of the route block k is "0" (S304).

If the flag is "0" (YES at S304), the link series does not vary with a weather condition. Then the required travel time difference comparison unit 108 computes a required travel time Ti with respect to one link series 1273 corresponding the route block k by each weather condition (S305). Specifically, the required travel time difference comparison unit 108 computes a required travel time Ti for going through the route block k for the departure time ti under a weather condition i using the above function Travel_Time i (ti, route block k). Then, it stores the required travel time Ti corresponding to the each weather condition (j) 1281 in the required travel time information 128 as illustrated in FIG. 8.

Further, the required travel time difference comparison unit 108 registers the route block k as a block comprising the guide route (S306).

Figures 10, 11:
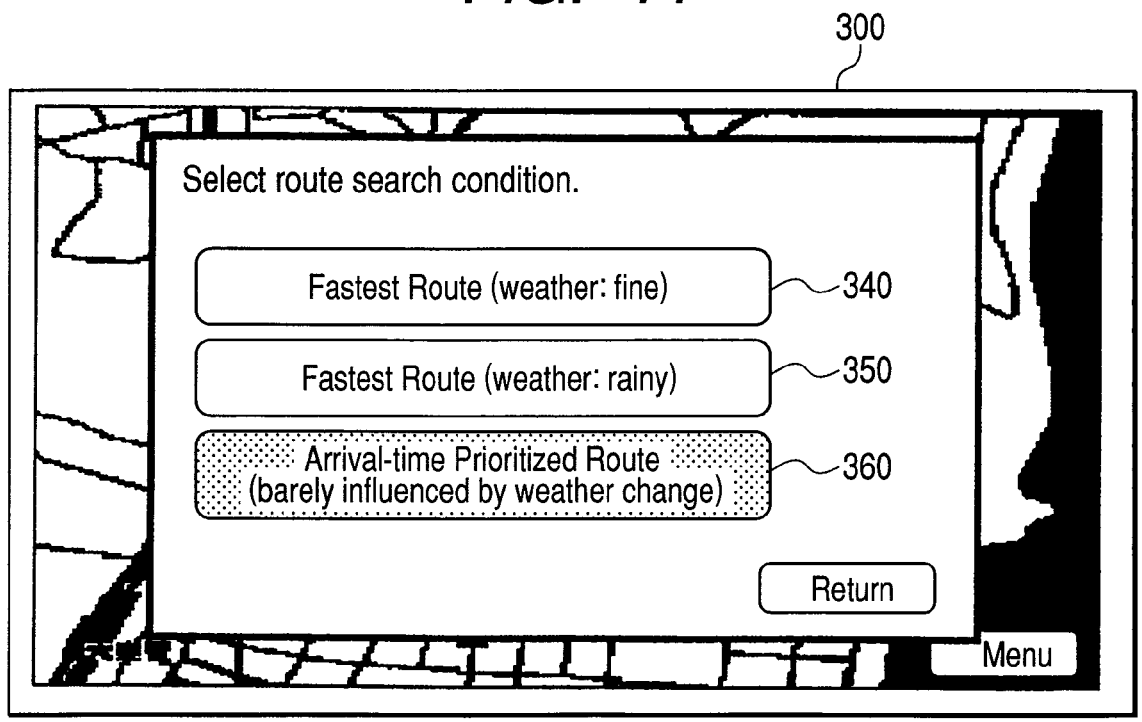
FIG. 10 illustrates a configuration of guide route information.
FIG. 11 is an example of a display screen image.

FIG. 10 illustrates a configuration of guide route information 129 in which link series comprising the guide route are stored. The required travel time difference comparison unit 108, as illustrated in the drawing, stores the guide route information 129 which includes a route block 1291 comprising the guide route and a link series 1292 comprising the each route block 1291. Further, the guide route information 129 includes a required travel time 1294 under each weather condition (j) 1293 for the each link series 1292.

Description will be continued referring back to FIG. 9. The required travel time difference comparison unit 108 adds each Ti to each ti and updates the passage time ti at the start point of the route block k+1 (S307). Then, the processing proceeds to Step S314.

Meanwhile, if the flag of the route block k is "1" (NO at S304), the required travel time difference comparison unit 108 carries out weather condition loop processing (S308 to S310).

In the weather condition loop processing, the required travel time difference comparison unit 108 computes a required travel time Ti_j for each link series (route block k_j) comprising the route block k under each weather condition j (j=1, 2, 3 . . . ) (S309), using the above-mentioned function, Travel_Time i (ti, block k_j). Further, it stores a required travel time (Ti_j) 1284 corresponding to each weather condition (j) 1283 in the required travel time information 128 as illustrated in FIG. 8. When the processing is completed with respect to the link series k_j for all the weather conditions j, it exits the weather condition loop.

The required travel time difference comparison unit 108 selects a link series with the smallest amount of change in the required travel time due to weather condition (S311). Specifically, the required travel time difference comparison unit 108 carries out the following processing with respect to each link series (k_j) 1275 for each weather condition 1274: it determines the maximum value Max(Ti_j) and the minimum value Min(Ti_j) from the required travel times (Ti_j) 1284 for each weather condition 1283, and computes the difference ΔT_j between them. The required travel time difference comparison unit 108 compares the difference ΔT_j for each link series (k_j) 1275 and identifies the link series with the smallest difference ΔT_j. Then, it registers the identified link series in the guide route information 129 as a link series comprising the guide route, as mentioned above (S312).

Further, the required travel time difference comparison unit 108 adds each Ti_j 1284 for each link series (link travel time under the each weather condition 1283) registered as a link series comprising the guide route to each ti (S313). Then, it updates the arrival time ti at the start point of the route block k+1 (S313). Thereafter, the processing proceeds to Step S314.

At Step S314, the required travel time difference comparison unit 108 increments k. If the route block k is not the last block (block in which the vehicle arrives at the destination), the processing, returning to the first one (S304) of the block loop processing, continues. Meanwhile, if the route block k is the last block, the processing exits the block loop processing and the required travel time difference comparison processing terminates.

In this example, the maximum difference ΔT_j in the required travel time by each weather condition is compared when a link series is selected to be registered as a block comprising a guide route. The invention is not limited to this.

For example, variances or standard deviations may be compared instead of the ΔT_j. Specifically, the required travel time difference comparison unit 108 determines the variance (or standard deviation) of the required travel time 1284 for each weather condition 1283 with respect to each link series (k_j) 1275. Then, it identifies the link series with the smallest variance value (or standard deviation) and registers it as a link series comprising the guide route.

Alternatively, the maximum values of difference of the required travel time between under a specific weather condition (for example, fine weather) and under the other weather conditions may be compared. Specifically, the required travel time difference comparison unit 108 determines, with the required travel time 1284 under a specific weather condition (for example, fine weather) taken as the reference value, difference between the required travel time 1284 under each of the other weather conditions and the reference value with respect to each link series (k_j) 1275. Then, it determines the maximum value of the difference with respect to each link series. It identifies the link series with the smallest maximum value of the difference from the link series 1275 and registers it as a link series comprising the guide route.

This is the end of the description of the processing illustrated in FIG. 9.

<Guide Route Composition Processing>

Description will be given to guide route composition processing which is carried out following the above-mentioned required travel time difference comparison processing.

The guide route composition unit 110 carries out processing of outputting the guide route to the display processing unit 116 using the guide route information 129 illustrated in FIG. 10. The guide route information 129 includes link series 1292 comprising the guide route from the present position to the destination, and the required travel time 1294 for going through the link series under each weather condition. The guide route composition unit 110 connects the link series 1292, which has been registered as blocks comprising the guide route, from the present position to the destination, and thereby generates the guide route. Further, the guide route composition unit 110 refers to the statistical traffic information 122 and computes estimated total required travel time for going to the destination under each weather condition. In this computing, the guide route composition unit 110 uses the function used in the above-mentioned required travel time difference comparison processing and computes the total required travel time Tj (j=1, 2, 3 . . . ) for going to the destination under each weather condition according to equation (1).

$$Tj = \text{Travel\_Time}_j(ts, R) \quad \text{equation (1)}$$

(J=1, 2, 3 . . . )

where, ts is the time when the vehicle departs from the present position; and R is a link series comprising the guide route. The guide route composition unit 110 outputs the generated guide route information to the display processing unit 116 and terminates the processing.

<Display Processing>

Description will be given to screen display processing carried out at the display processing unit 116.

First, contents on screen displayed by the display processing unit 116 during the route search processing will be described.

FIG. 11 is an example of a display screen image 300 displayed by the display processing unit 116 when a destination is inputted and set by the operating input unit 102 and an instruction to carry out the route search is accepted. The display processing unit 116 displays a menu screen to prompt the user to select route-search conditions on the screen. The menu screen includes, for example, as route-search conditions, "Fastest Route (weather: fine)" 340, "Fastest Route (weather: rainy)" 350, and "Arrival-time Prioritized Route (barely influenced by weather change)" 360. If the "Arrival-time Prioritized Route (barely influenced by weather change)" 360 is selected, the operating input unit 102 informs the route search unit 104 of the selection. In response to the informing, the route search unit 104 carries out the route search processing illustrated in FIG. 5. Then the different block extraction unit 106 carries out the different block extraction processing in FIG. 7. Thereafter, the required travel time difference comparison unit 108 carries out the required travel time difference comparison processing in FIG. 9. Lastly, the guide route composition unit 110 carries out the guide route composition processing as mentioned above.

Meanwhile, if the "Fastest Route (weather: fine)" 340 or the "Fastest Route (weather: rainy)" 350 is selected, the route search unit 104 searches for a route from the present position to the destination using the statistical traffic information only for the weather condition of "fine weather" or "rainy weather," respectively. Although only "fine weather" and "rainy weather" can be selected as the weather condition in this example, it also may be possible that one of any other weather conditions is selected or multiple conditions are simultaneously selected. In addition, although the screen display image illustrated in FIG. 11 is displayed when an instruction to carry out the route search is accepted through the operating input unit 102 in this example, following procedure may be taken: options such as "Distance Prioritized" and "Traffic-jam Considered" are displayed as the route search conditions before the above screen display image is displayed; and if "Traffic-jam Considered" is selected and an instruction to carry out a search with the statistical traffic information taken into account is accepted, such a screen display image as illustrated in FIG. 11 is displayed for setting detailed condition.

Figure 12:
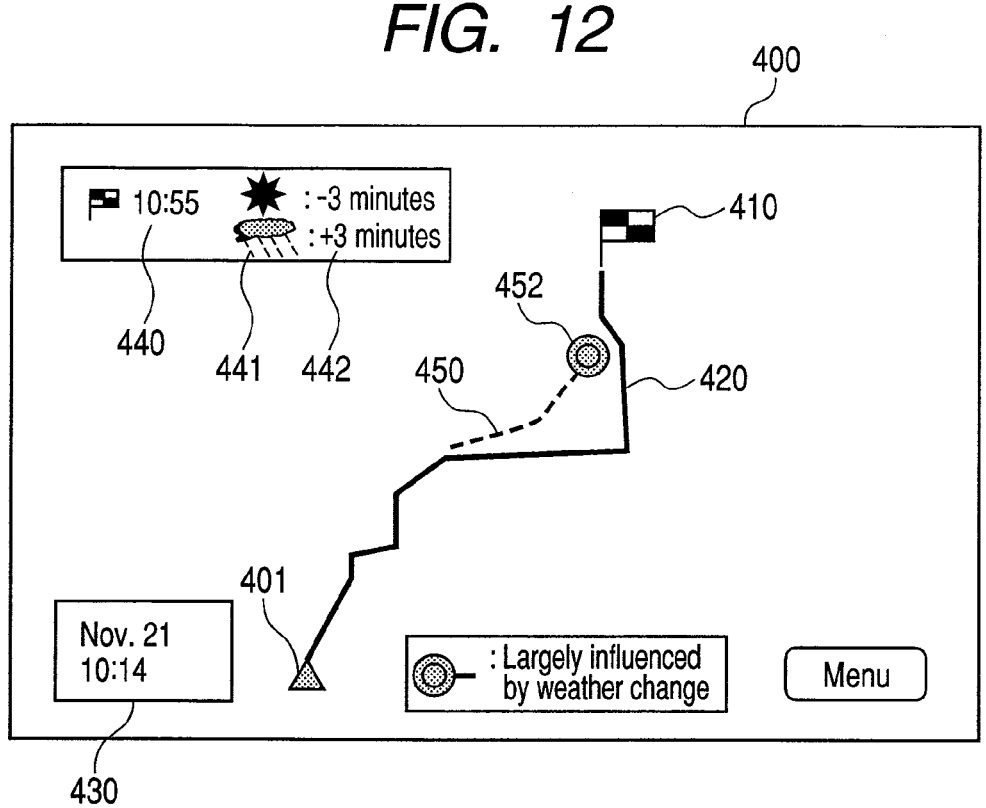
FIG. 12 is another example of a display screen image.

FIG. 12 is an example of the screen display image of the guide route information. The screen display image is displayed when the "Arrival-time Prioritized Route (barely influenced by change in weather)" 360 in FIG. 11 is selected and the display processing unit 116 receives the guide route information from the guide route composition unit 110.

As illustrated in FIG. 12, the display processing unit 116 displays an icon 401 on a display screen image 400, indicating the present position of the relevant vehicle on a map around the position, which is detected by the present position detection unit 112. Further, it displays another icon 410 indicating the destination based on the destination information accepted through the operating input unit 102. In addition, it displays a line 420 on the map obtained by mapping the link series, which is included in the guide route received from the guide route composition unit 110, from the present position to the destination. Furthermore, it may display a time and date 430 indicating when the route search processing is carried out.

The display processing unit 116 may display an estimated arrival time 440, which is determined based on the total required travel time, received from the guide route composition unit 110, by each weather condition for going from the present position to the destination. Specifically, the display processing unit 116 carries out following processing: it computes an average total time required for going to the destination under respective weather conditions; it adds this average time to the departure time and determines an estimated arrival time; and it displays this estimated arrival time 440 together with an icon indicating the destination as illustrated in FIG. 12.

The display processing unit 116 may compute an average of total required travel times by weather conditions as a reference value; compute difference between the reference value and a total required travel time or an arrival time under a specific weather condition; and display the difference. Specifically, for example, an estimated arrival time that is obtained with an average of total required travel times by weather conditions is determined as a reference value; differences are computed between the reference value and an estimated arrival time under "fine weather" and "rainy weather;" and the differences 442 are displayed with icons 441 indicating "fine weather" and "rainy weather" next to them as illustrated in FIG. 12.

Further, the display processing unit 116 may display a difference in total required travel time or arrival time relative to those under a specific weather condition. Specifically, for example, an estimated arrival time under "fine weather" is taken as a reference value; differences between the reference value and an estimated arrival time under other weather conditions are computed; and the differences are displayed together.

The display processing unit 116 may display a block 450 where the required travel time is largely varied depending on weather conditions and an icon 452 indicating the large variation. Specifically, the display processing unit 116 generates information on such a block by referring to the route block information 127 generated by the different block extraction unit 106 and the statistical traffic information 122.

More specific description thereof will be given. The display processing unit 116 compares the link series 1275 in the route block information 127 with the link series 1292 in the guide route information 129. The link series 1275 vary with weather conditions. (For example, the link series 1275 is a link series under a weather condition 1274 of a route block 1271 whose flag 1272 is "0".) Then, the display processing unit 116 extracts link series that are not included in the guide route. The display processing unit 116 obtains required travel times by weather conditions for the link series that are not included in the guide route. (These required travel times are equivalent to the required travel times 1284 under each weather condition 1283 in FIG. 8.) The display processing unit 116 determines the block length (total value of the link lengths of link series) of the route block comprised of the link series using the map information 120. It divides the determined block length by the required travel time under each weather condition, determining running speed for a block under each weather condition. Further, it computes an average value of the running speeds under all the weather conditions and determines whether or not difference between the average value and that of the running speed under each weather condition is equal to or greater than a predetermined value (for example, 20 km/h). Then, it extracts blocks in which the above difference is equal to or greater than the predetermined value from the different blocks. The display processing unit 116, as illustrated in FIG. 12, displays a circular icon 452, for example, in the position of the end point of each of the extracted block and also draws a line over a position of the block 450. Line type or color of the line indicating the block 450 is different from that representing the guide route.

As mentioned above, the display processing unit 116 displays a block influenced largely by weather change on the screen. Therefore, it is possible to indicate that a route has been selected as the guide route that excludes blocks easily influenced by weather. Further, an amount of variation by weather from the estimated arrival time, which is the reference value, is displayed on the screen. This makes it possible to confirm that the required travel time is barely varied depending on weather and grasp at a glance how much the arrival time varies by change in weather.

Figure 13:
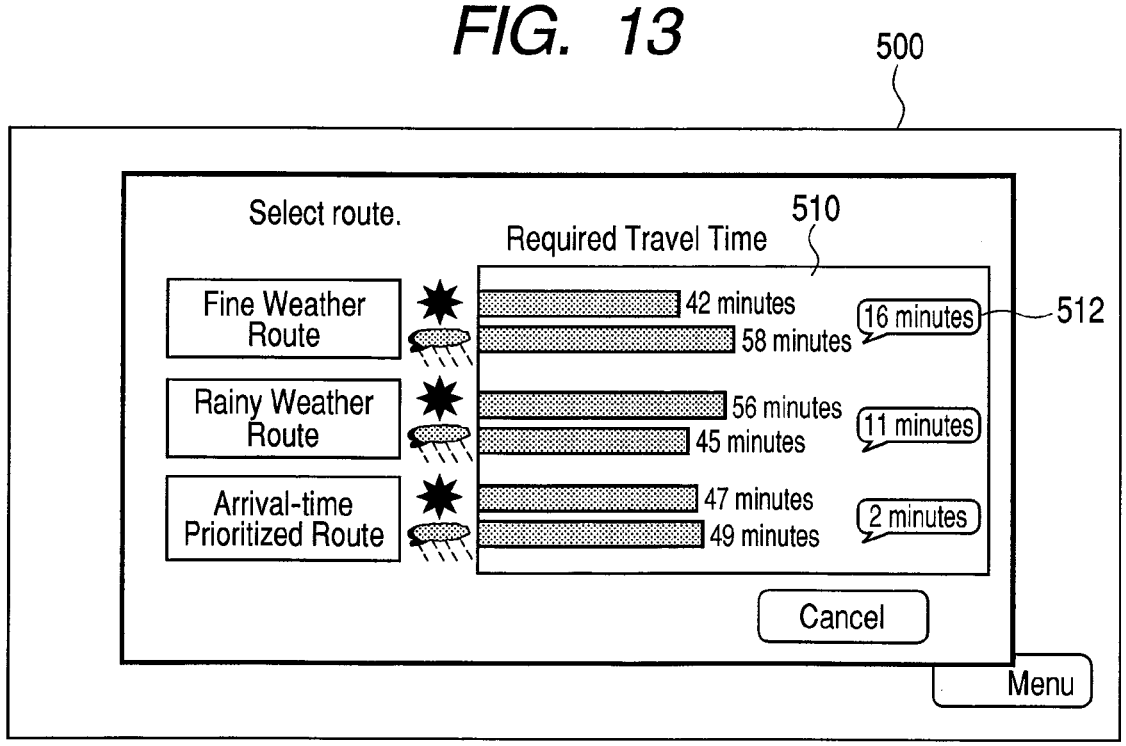
FIG. 13 is another example of a display screen image.

FIG. 13 is another example of a display screen image 500 displayed by the display processing unit 116. A user's request decides which image is to be displayed, the above-mentioned display screen image 300 in FIG. 11, the image 400 in FIG. 12, or the image 500 in FIG. 13.

The display processing unit 116 obtains route-composing link series 1261 under a predetermined specific weather condition (for example, fine weather and rainy weather) from the weather condition-based searched route information 126 illustrated in FIG. 6. Then, using the statistical traffic information 122, it determines a total required travel time under each weather condition with respect to each route comprised of the obtained link series 1261. Similarly, it obtains link series 1292 from the guide route information 129 illustrated in FIG. 10. Then, using the statistical traffic information 122, it determines a total required travel time under each weather condition with respect to the obtained route.

Then, as illustrated in FIG. 13, the display processing unit 116 displays total travel times 510 by each weather condition for optimum routes under weather conditions (for example, "Fine Weather Route" and "Rainy Weather Route") and the guide route ("Arrival-time Prioritized Route"). It displays the total travel times 510 by bar graph so that differences 512 between weather conditions in the each route can be easily compared. Display images of the total travel times 510 are not limited to bar graph and can be expressed in various schematic manners.

Embodiments of the present invention are not limited to the above ones and can be variously modified.

What is claimed is:

1. A route search device comprising:
   a storage medium for storing traffic information classified by weather conditions;
   a pointing device which sets a starting point and a destination; and
   a guide route search module that searches routes having a shortest required travel time for a plurality of weather conditions from the starting point to the destination, calculates a plurality of required travel times for each of the weather conditions for each of the searched routes, and selects a route having the smallest amount of variation of the plurality of the required travel times from the searched routes as a guide route by using traffic information stored in the storage medium;
   wherein the traffic information stored in the storage medium includes travel time for each link comprising a road on a map under each weather condition, and wherein the guide route search module includes:
a weather condition-based route search module that determines a shortest travel time route from the starting point to the destination under each weather condition by using the traffic information stored in the storage medium;
a link series-identifying module that extracts link series which vary with weather conditions from link series comprising the shortest travel time route determined by the weather condition-based route search module, determines required travel time for each of the link series that vary with weather conditions by using the traffic information stored in the storage medium, and identifies a link series smallest in the amount of variation in the required travel time for the weather conditions in each of the link series; and
a link series-registering medium for registering a link series identified by the link series-identifying module as a link series comprising the guide route from the starting point to the destination.

2. The route search device according to claim 1, wherein the link series-identifying module determines the amount of variation in required travel time depending on weather conditions by using difference between a maximum value and a minimum value of required travel times depending on weather conditions for the link series.

3. The route search device according to claim 1, wherein the link series-identifying module determines the amount of variation in required travel time depending on weather conditions by using a maximum difference between the required travel times depending on weather conditions for the link series and a required travel time under any one of the weather conditions.

4. The route search device according to claim 1, wherein the link series-identifying module determines the amount of variation in required travel time depending on weather conditions by using a variance or a standard deviation of the required travel times depending on weather conditions for the link series.

5. The route search device according to claim 1, comprising:
a total required travel time-computing unit that determines a total required travel time for each guide route depending on weather conditions by using the traffic information stored in the storage medium; and
a display control unit that displays the total required travel time determined by the total required travel time-computing unit corresponding to weather conditions.

6. The route search device according to claim 1, comprising:
a total required travel time-computing unit that determines a total required travel time for the guide route depending on weather conditions using the traffic information stored in the storage medium; and
a display control unit that determines difference between the total required travel times depending on weather conditions and the average value of the total required travel times and displays the difference.

7. The route search device according to claim 1, comprising:
a total required travel time-computing unit that determines a total required travel time for each guide route depending on weather conditions by using the traffic information stored in the storage; and
a display control unit that determines difference between a required travel time under a specific weather condition and the total required travel times under other weather conditions and displays the difference.

8. The route search device according to claim 1, comprising:
a display control unit that takes a link series that is not included in the guide route among the link series that vary with weather conditions as a block influenced largely by weather conditions, and displays this link series in a different mode from that of the guide route.

9. The route search device according to claim 1, comprising:
a display control unit that displays a menu screen including options for accepting use's requests to search for a route in which the required travel time is less influenced by weather conditions.

10. A route search method for a route search device, including a storage medium for storing traffic information classified by weather conditions,
wherein the route search device carries out:
a step of setting a starting point and a destination; and
a guide route search step of searching routes having a smallest required travel time for a plurality of weather conditions from the starting point to the destination, calculating a plurality of required travel times for each of the weather conditions for each of the searched routes, and selecting a route having the smallest amount of variation of the plurality of the required travel times from the searched routes as a guide route by using traffic information stored in the storage medium; wherein the traffic information stored in the storage medium includes travel time for each link comprising a road on a map under each weather condition, and wherein the guide route search step includes: a weather condition-based route search step of determining a shortest travel time route from the starting point to the destination under each weather condition using the traffic information stored in the storage medium; a link series-identifying step of extracting link series that vary with weather conditions from link series comprising each route determined at the weather condition-based route search step, determining required travel time for each of the link series that vary with weather conditions using the traffic information stored in the storage medium, and identifying a link series smallest in the amount of variation in the required travel time for the weather conditions in each of the link series; and a link series-registering step of registering a link series identified by the link series-identifying step as a link series comprising the guide route from the starting point to the destination.

* * * * *